United States Patent
Kohler et al.

(10) Patent No.: US 6,283,215 B1
(45) Date of Patent: Sep. 4, 2001

(54) PROCESS FOR THERMAL INSULATION OF PRODUCTION TUBINGS PLACED IN A WELL BY MEANS OF A NON-RIGID FOAM AND A SYSTEM FOR WORKING A FLUID PRODUCING WELL

(75) Inventors: Norbert Kohler, Villennes sur Seine; Jacques Jarrin, Nanterre; Jean-François Argillier, Saint-Cloud, all of (FR)

(73) Assignee: Institut Francais Du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/330,159

(22) Filed: Jun. 11, 1999

(30) Foreign Application Priority Data

Jun. 11, 1998 (FR) .................................... 98 07404

(51) Int. Cl.⁷ ..................................................... E21B 36/00
(52) U.S. Cl. ........................... 166/302; 166/57; 166/309; 166/901
(58) Field of Search .............................. 166/302, 57, 309, 166/303, 901

(56) References Cited

U.S. PATENT DOCUMENTS

| | | |
|---|---|---|
| 3,444,279 * | 5/1969 | Dost ...................................... 166/302 |
| 4,258,791 | 3/1981 | Brandt . |
| 4,296,814 * | 10/1981 | Stalder et al. .................... 166/302 X |
| 5,016,716 | 5/1991 | Donavan . |
| 5,858,489 * | 1/1999 | Beauquin ......................... 166/302 X |

FOREIGN PATENT DOCUMENTS

| | | | |
|---|---|---|---|
| 0110764 A | * | 6/1984 | (EP) . |
| 2532988 | * | 3/1984 | (FR) ..................................... 166/302 |
| 2532988 A | * | 3/1984 | (FR) . |

* cited by examiner

*Primary Examiner*—William Nueder
(74) *Attorney, Agent, or Firm*—Antonelli, Terry, Stout & Kraus, LLP

(57) ABSTRACT

A process for insulating a tubing string placed in a pipe and through which a fluid circulates, the insulant being a non-rigid foam produced from a liquid solution and placed in the annular space defined by the outside of the tubing string and the walls of the pipe in which these tubings are placed. A production well (1) opens, in the lower part thereof, onto a producing rock containing a fluid to be extracted. Tubing (2) is placed in production well (1). A zone (3) represents the annulus defined between the outside (5) of the tubing string and the walls of well (1) in which the tubing string is placed. A tube for injecting a liquid and/or gaseous fluid (4) is placed in annulus (3) and a liquid and/or gaseous fluid injection nozzle (6) opens into zone (3).

8 Claims, 1 Drawing Sheet

PROCESS FOR THERMAL INSULATION OF PRODUCTION TUBINGS PLACED IN A WELL BY MEANS OF A NON-RIGID FOAM AND A SYSTEM FOR WORKING A FLUID PRODUCING WELL

FIELD OF THE INVENTION

The present invention relates to the field of tubings used for carrying fluids, and more particularly to tubings placed in wellbores. These tubings are placed in a hydrocarbon producing borehole and they serve either as fluid delivery lines by means of a borehole pump or directly as production lines in the case of eruptive reservoirs, or as injection lines for injecting fluids into a reservoir.

More generally, the present invention relates to tubings for carrying fluids placed in a pipe.

BACKGROUND OF THE INVENTION

The fluids conveyed by these tubings can be of very different kinds, and most often these tubings will be used for oil extraction. It is often interesting to transport oil at its bottomhole temperature, thus avoiding a certain number of drawbacks generated by heat exchanges with the outside. These drawbacks are for example paraffin, asphaltene, hydrate or viscous crude deposits under surface conditions, condensation or instability phenomena, productivity losses. These drawbacks can generate phenomena referred to as self-killing phenomena and lead to premature well or even field abandonment.

A known solution consists of thermally insulating the production tubing so as to minimize heat losses as the fluids flow therethrough, with the aim of keeping the thermal conductivity of these insulated tubings in the 0.05–0.2 watt/m/° C. range.

Various thermal insulation methods for tubings exist and have already been applied in production fields. A distinction can be made between complete tubing insulation processes using various fluids, for example gas, oils, aqueous or organic gels. molten sulfur, and processes for insulating the outer wall of the production tubing, for example lining using insulating materials, aluminium-based insulating paints, rigid foams and polysilicate foams generated in situ.

All these techniques are either expensive or not very effective, or hardly reversible. Using fluids whose reversibility would not be total furthermore presents risks of damage to certain producing formations as weakly soluble products are brought into contact. The reversibility of the systems used thus appears to be essential.

SUMMARY OF THE INVENTION

The present invention relates to a process for thermally insulating reversibly a string comprising at least one tubing placed in a pipe and in which a fluid circulates, the insulant being a non-rigid foam produced from a liquid solution and a gas, said foam is situated in the annular space defined by the outside of the tubing string and the walls of the pipe in which these tubings are placed.

According to a variant, the pipe is a wellbore; this wellbore is preferably cased with a steel pipe.

The main advantages of the process according to the present invention are as follows: on account of its low density, the non-rigid foam has a very low thermal conductivity in relation to the dense materials generally used, its insulating properties are therefore enhanced. Without referring to any theory, one may think that the no generation of a foam in the annular space allows this space to be partitioned. The gas contained in this space will therefore be less inclined to circulate in said space, and convection phenomena will be limited.

This foam generally has a density ranging between 0.01 and 0.8 and preferably less than 0.3; the nature of this foam also allows to add anticorrosion additives whose function is to protect the metallic surfaces of the production tubing and of the casing string of the well. The nature of this foam also reversibly allows to return to the state preceding the formation of said foam; this property can be interesting if servicing operations have to be carried out in the annular space defined by the outside of the tubing string and the walls of the pipe in which these tubings are placed, for example if one of the tubings has to be replaced. Furthermore, these solutions comprising one or more additives that contribute to foaming the carrier fluid and contain mainly water and/or an organic liquid are economically interesting.

The non-rigid foam used in the insulation process according to the invention is produced by introducing at least one foaming agent selected from the group made up of the systems of foaming agents for aqueous foams and the systems of foaming agents for foams based on an organic liquid into at least one liquid phase selected from the group made up of water and organic liquids.

One or more additives can also be added to the foaming agent. These additives are generally foam formation promoting additives, foam stability promoting additives, anticorrosion agents heat-stabilizing agents, viscosifiers, liquid phase thickeners.

To produce aqueous foams, one can use at least one foaming agent selected from the group made up of anionic, non-ionic, cationic or amphoteric surfactants, or combinations of these various surfactants according to whether the temperature stability, the resistance to possible contaminations (water, salts, hydrocarbons, . . . ), wall adherence, compatibility with the carrier fluid and the possible thickening and/or weighting agents is favoured.

To produce oil-based foams, one can use, as the case may be, at least one foaming agent selected from the group made up of the foaming agents obtained from gas oil, kerosine, oils or derivatives of vegetable origin, linear alkanes possibly substituted such as, for example, fluorinated surfactants, esters, antines, aluminium complexes. All kinds of liposoluble surfactants or crudes with high foaming properties can also be used.

Concerning the liquid phase thickening or stabilizing agents, they are generally high-molecular polymers, for example hydrosoluble polymers such as polyacrylamides, ethylene polyoxides, carboxymethylcellulose, hydroxyethylcellulose, liposoluble polymers such as polyolefins, polymethacrylates. The thickening agent can also be an aqueous or organic gel, or mineral particles dispersed in an aqueous or organic medium such as bentonites for example, or treated bentonites for use in organic media.

Non-toxic and/or biodegradable oils and systems of foaming and gelling agents will be advantageously used.

Setting the foam in the annulus defined by the outside of the tubing string and the walls of the well in which these tubings are placed is generally performed according to one of the procedures described below.

The foam is generated at the surface and pumped into the annulus or the tubing provided with bottom valves allowing circulation with the annulus.

The solution containing the foaming agent can also be injected into the annulus and the foam is then formed in situ by injecting gas at the base of the column of fluid, by means of a tube preferably placed in the annulus. In this case, the annulus can be kept open at the surface or controlled by a shutting valve or a choke.

The gases used for producing the foam or the gel are air, nitrogen, natural gases, exhaust gases, carbon dioxide ($CO_2$) and mixtures thereof.

In any case, it may be useful to maintain, by a suitable means, a minimum continuous flow of gas injected in the lower part of the annulus throughout the period of use of the foam.

When the invention relates to wellbores, two fluids are referred to. A distinction thus has to be made between the<<fluid to be extracted>>from the producing rock and the<<liquid and/or gaseous fluid>>corresponding to the foam generated before or in situ.

The present invention also relates to a system for working a fluid producing well comprising at least one tubing placed in the wellbore and in which said fluid to be extracted circulates. The working system also comprises a non-rigid insulating foam situated in the annulus defined by the outside of the tubing string and the walls of the well in which these tubings are placed, and at least injection means whose outlets are situated in said annulus.

These means allow injection of either a previously formed foam or of a gas intended to cause the constituents of a foam placed in the annulus to foam. These injection means can comprise a valve placed at the top of the annulus, a valve placed at the bottom of the annulus, an injection line whose outlet is situated in the annulus, this line being situated either in the annulus itself or in the tubing string.

The top valve situated in the upper part of the annulus allows to inject a foam formed at the surface. The bottom valve allows to inject a gas into the annulus and thus to cause the constituents of a foam placed in said annulus to foam. The injection lines whose outlet is situated in the annulus and that are situated either in the annulus itself or in the tubing string allow to introduce into said annulus a previously formed foam or a gas intended to cause the constituents of a foam placed in said annulus to foam. In the case where the fluid injection line is positioned in the tubing, this tubing is equipped with bottom circulation valves.

BRIEF DESCRIPTION OF THE SEVERAL VIEWS OF DRAWINGS

DETAILED DESCRIPTION

The working system will be clear from reading the description of FIGS. 1 to 4 hereafter.

Figure 1:
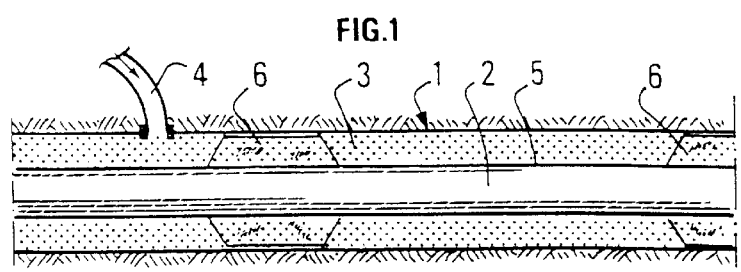
FIG. 1 shows a tubing for carrying fluids according to the present invention.

FIG. 1 is a simple representation of the invention where a tubing string 2 carrying a fluid is placed in a pipe 1. Centering means 6, blade centering means for example, support tubing string 2 and keep this string in such a position that the main axis of said string substantially merges with the main axis of pipe 1. Zone 3 represents the annulus defined by the outside 5 of the tubing string and the walls of pipe 1 in which the tubing string is placed. A tube 4 for injecting a liquid and/or gaseous fluid opens into annular zone 3.

Figure 2:
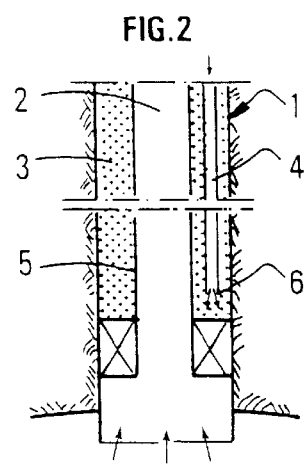
FIG. 2 shows a production well using the tubing according to the present invention.

FIG. 2 shows a production well 1 reaching, in the lower part thereof, a producing rock containing a fluid to be extracted. A tubing string 2 is placed in production well 1. Zone 3 represents the annulus defined by the outside 5 of the tubing string and the walls of well 1 in which these tubings are placed. A tube for injecting a liquid and/or gaseous fluid 4 is placed in annulus 3, a nozzle 6 for injecting the liquid and/or gaseous fluid opens into zone 3.

Figure 3:
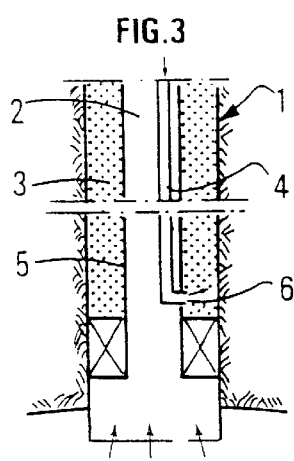
FIG. 3 shows a production well using the tubing according to another embodiment of the present invention.

FIG. 3 shows a production well 1 reaching, in the lower part thereof, a producing rock containing a fluid to be extracted. A tubing string 2 is placed in production well 1. Zone 3 represents the annulus defined by the outside 5 of the tubing string and the walls of well 1 in which these tubings are placed. A tube 4 for injecting a liquid and/or gaseous fluid is placed in the tubing, a nozzle 6 for injecting the liquid and/or gaseous fluid opens into zone 3.

Figure 4:
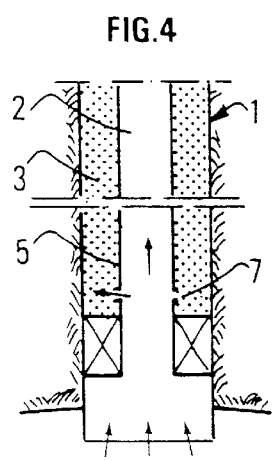
FIG. 4 shows a production well using the tubing according to another embodiment of the present invention.

FIG. 4 shows a production well reaching, in the lower part thereof, a producing rock containing a fluid to be extracted. A tubing string 2 is placed in production well 1. Zone 3 represents the annulus defined by the outside 5 of the tubing string and the walls of well 1 in which these tubings are placed. Valves 7 allow to control the gaseous flow entering annular zone 3.

Setting of the foam can be achieved in different ways.

In general (FIG. 1), the foam can be generated outside pipe 1 and injected into annular zone 3 by means of tube 4; a liquid and a foaming agent can also be injected into annular zone 3, then a gas is injected into annulus 3, the foam being then formed in situ.

In the case of a wellbore, the foam generated at the surface can be set in the annulus either by means of a tube 4 placed in the tubing equipped with bottom valves allowing circulation with the annulus (a system in accordance with FIG. 3 is then used) or by pumping into the annulus (a system in accordance with FIG. 2 is then used).

It is also possible to inject the solution containing the foaming agent into the annulus, then to form the foam in situ by injecting gas at the base of the column of fluid (well bottom), either by means of a gas injection tube placed in the tubing and equipped with bottom valves allowing circulation with the annulus (a system in accordance with FIG. 3 is then used), or by means of a gas injection tube placed in the annulus (a system in accordance with FIG. 2 is then used).

When the reservoir contains (gas, part of the gas from the production well can be extracted from the bottom and used to cause the reactants (foaming agent and liquid) placed in the annulus to foam (a system in accordance with FIG. 4 is then used).

What is claimed is:

1. A process for thermally insulating reversibly a string in which fluid circulates, comprising providing at least one tubing string in a pipe, the pipe being a wellbore, so as to provide an annular space defined between an outside of the tubing string and inside walls of the pipe, and producing a non-rigid foam insulant in the annular space from a liquid solution and a gas, wherein the non-rigid foam insulant is set by injecting a solution containing a foaming agent into the annulus, then by forming the foam in situ by injecting gas at the base of the column of fluid.

2. A process as claimed in claim 1, wherein the solution comprises at least one foaming agent selected from the group consisting of systems of foaming agents for aqueous foams and systems of foaming agents for foams based on an organic liquid and at least one liquid phase selected from the group made up of water and organic liquids.

3. A process as claimed in claim 1, wherein the foaming agent is selected from the group consisting of anionic, non-ionic, cationic or amphoteric surfactants.

4. A process as claimed in claim 1, wherein the foaming agent is selected from the group consisting of the foaming agents obtained from gas oil, kerosine, oils or derivatives of vegetable origin, olefins, linear alkanes, esters, amines, aluminum complexes, liposoluble surfactants or crudes with high foaming properties.

5. A process as claimed in claim 1, wherein the solution includes at least one additive selected from the group consisting of foam stability promoting additives, anticorrosion agents, heat-stabilizing agents, viscosifying agents, and liquid phase thickeners.

6. A process as claimed in claim 1, wherein the gas used is selected from the group consisting of air, nitrogen, natural gases, exhaust gases, carbon dioxide and mixtures thereof.

7. A system for working a fluid-produced well, comprising at least one tubing string placed in the well and in which said fluid to be extracted circulates, characterized in that it comprises a non-rigid insulating foam situated in an annulus defined between an outside of the tubing string and inside walls of the well in which the at least one tubing string is placed, and at least injection means whose outlets are situated in said annulus, wherein the injection means comprise a valve situated at the bottom of the annulus.

8. A system for working a fluid-produced well, comprising at least one tubing string placed in the well and in which said fluid to be extracted circulates, characterized in that it comprises a non-rigid insulating foam situated in an annulus defined between an outside of the tubing string and inside walls of the well in which the at least one tubing string is placed, and at least injection means whose outlets are situated in said annulus, wherein the injection means comprise an injection line situated in the tubing string and whose outlet is situated in the annulus.

* * * * *